No. 644,881. Patented Mar. 6, 1900.
C. J. D. WALTER & J. RODGERS.
SALES AND CASH REGISTER.
(Application filed Mar. 24, 1899.)

(No Model.) 2 Sheets—Sheet 1.

WITNESSES:
Donn Twitchell
Theo. J. Hosted

INVENTORS
Carl J. D. Walter
John Rodgers
BY
ATTORNEYS.

No. 644,881. Patented Mar. 6, 1900.
C. J. D. WALTER & J. RODGERS.
SALES AND CASH REGISTER.
(Application filed Mar. 24, 1899.)
(No Model.) 2 Sheets—Sheet 2.

WITNESSES:
Donn Twitchell
[signature]

INVENTORS
Carl J. D. Walter
John Rodgers
BY
[signature]
ATTORNEYS.

THE NORRIS PETERS CO., PHOTO-LITHO., WASHINGTON, D. C.

UNITED STATES PATENT OFFICE.

CARL J. D. WALTER AND JOHN RODGERS, OF NEW YORK, N. Y.

SALES AND CASH REGISTER.

SPECIFICATION forming part of Letters Patent No. 644,881, dated March 6, 1900.

Application filed March 24, 1899. Serial No. 710,303. (No model.)

*To all whom it may concern:*

Be it known that we, CARL J. D. WALTER and JOHN RODGERS, of the city of New York, borough of Manhattan, in the county and State of New York, have invented a new and Improved Sales and Cash Register, of which the following is a full, clear, and exact description.

The object of the invention is to provide a new and improved sales and cash register which is simple and durable in construction, easily manipulated, more especially designed for use in stores and like places, and arranged to enable a salesman to record a sale and the amount of cash received for the sale and placed in the till and to make a sales-slip for the customer.

The invention consists of novel features and parts and combinations of the same, as will be fully described hereinafter and then pointed out in the claims.

A practical embodiment of our invention is represented in the accompanying drawings, forming a part of this specification, in which similar characters of reference indicate corresponding parts in all the views.

Figure 1:
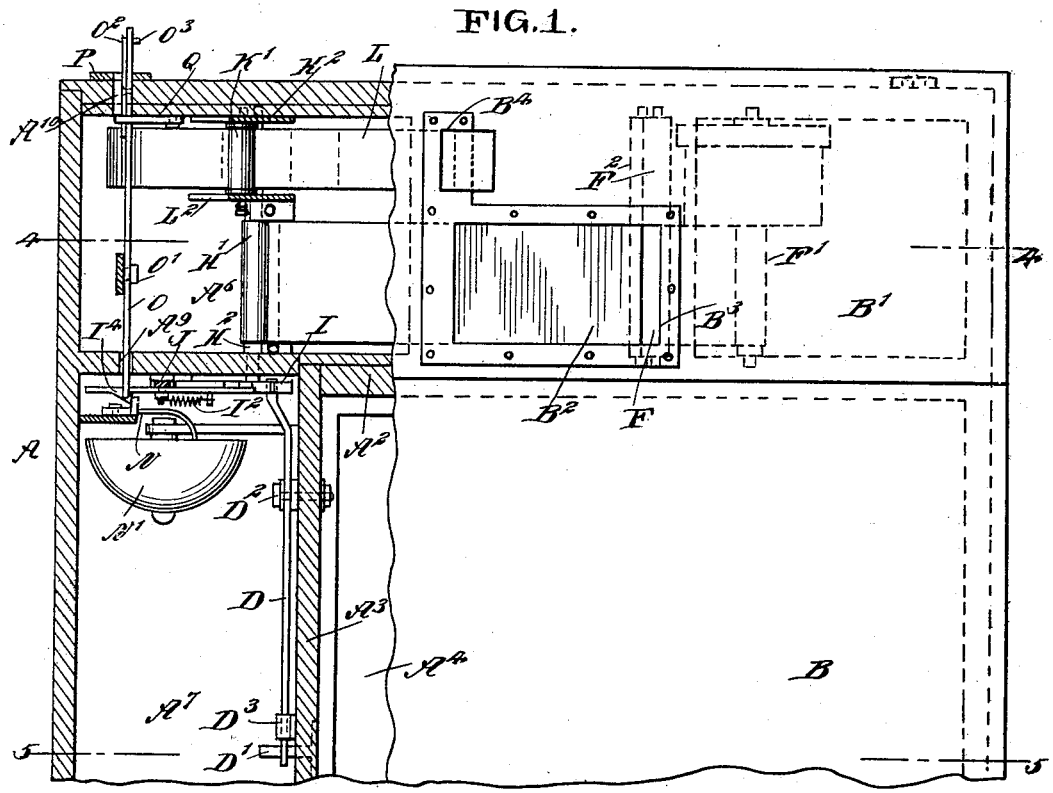
Figure 2:
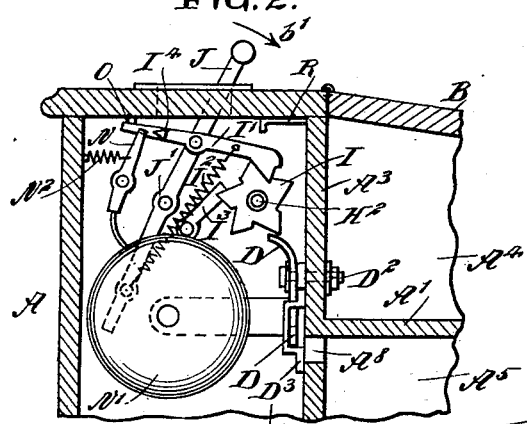
Figure 3:
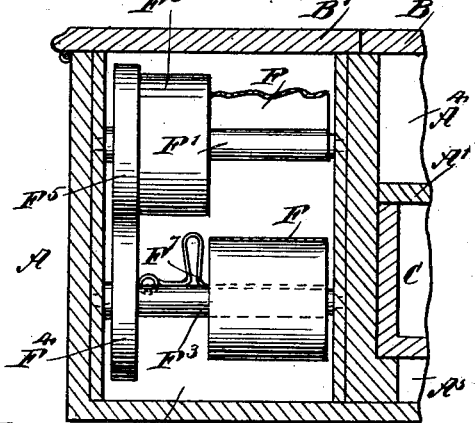
Figure 7:
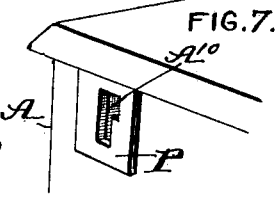
Figure 4:
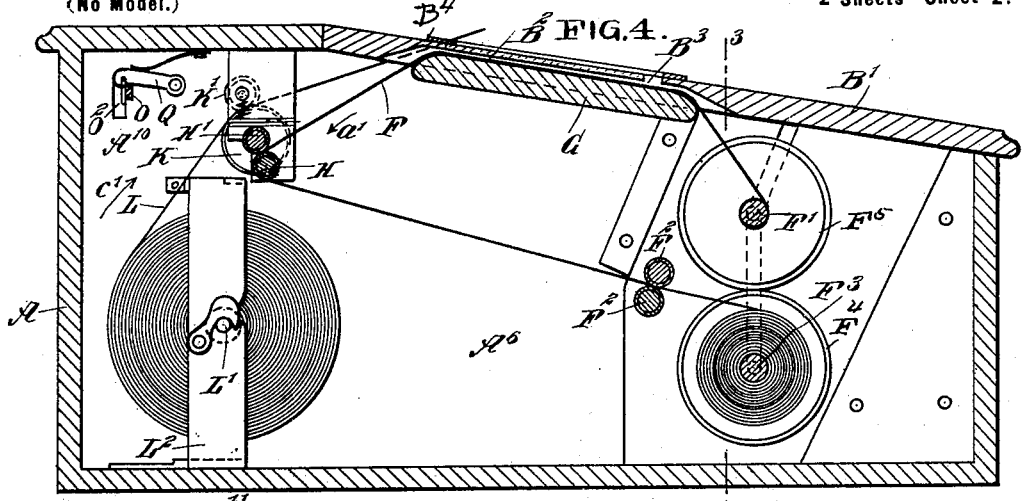
Figure 5:
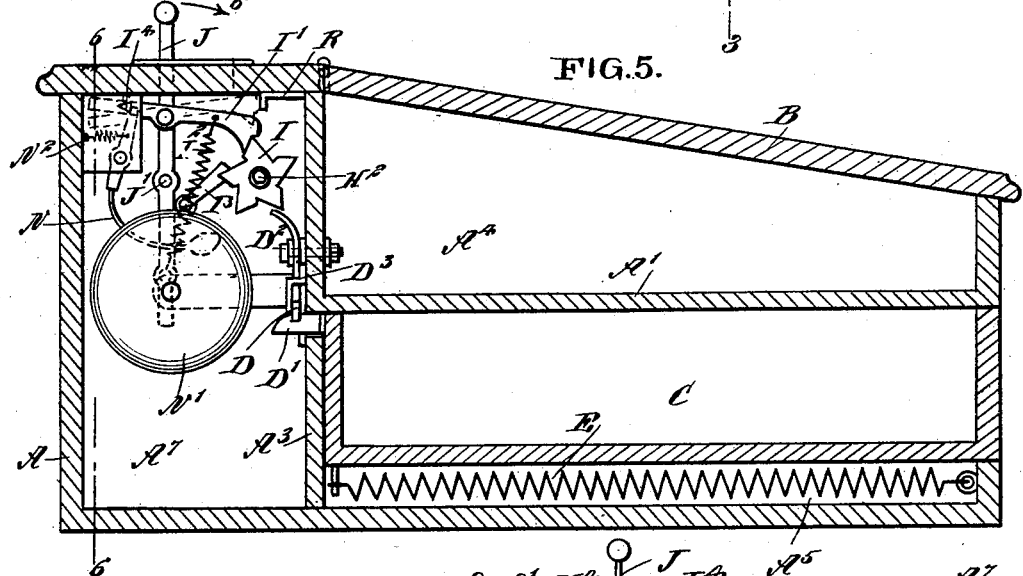
Figure 6:
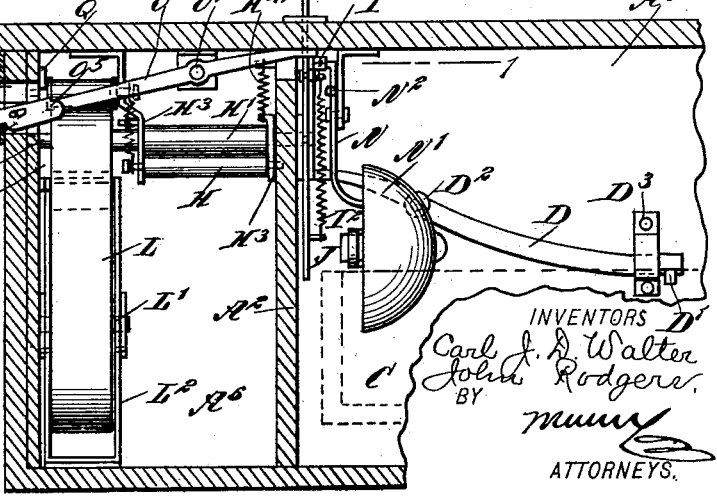

Figure 1 is a plan view of the improvement with parts in section on the line 1 1 in Fig. 6. Fig. 2 is a sectional side elevation of the till-alarm and the means for releasing the till. Fig. 3 is a transverse section of part of the improvement on the line 3 3 in Fig. 4. Fig. 4 is a sectional side elevation of the improvement on the line 4 4 in Fig. 1. Fig. 5 is a similar view of the same on the line 5 5 in Fig. 1. Fig. 6 is a transverse section of the same on the line 6 6 in Fig. 5, and Fig. 7 is a detail perspective view of a portion of the desk.

The improved apparatus is preferably mounted in a desk A, formed with a horizontal partition A', a longitudinal partition $A^2$, and a transverse partition $A^3$ to form a storage-compartment $A^4$ for containing papers, envelops, writing utensils, or the like, the compartment being normally closed by a cover B, hinged at its upper end to the top of the desk. Below the compartment $A^4$ is formed a till-compartment $A^5$, containing a till C, held in a closed position by a catch D', engaged by a pivoted latch D, which when the catch is released permits a pull-spring E to move the till C into an open position and allow of placing the money received from a sale in the till.

At one side of the desk is arranged a compartment $A^6$ for containing the paper-rolls and mechanism for shifting the paper to make a record of successive sales and also to form sales-slips for the customers, as hereinafter more fully described.

In the rear of the compartments $A^4$ $A^5$ is arranged a compartment $A^7$, containing an alarm mechanism, hereinafter more fully described in detail.

The side compartment $A^6$ is closed at the top by a cover B', hinged to one side of the desk to permit of swinging the cover open to give access to the paper-rolls and mechanism in the said compartment $A^6$. The cover B' is provided with a glass panel $B^2$, terminating at its lower end in a transverse slot $B^3$, formed in the cover to permit the passage of a pencil-point or other writing instrument and allow the salesman to write the particulars of the sale and the money received therefor on a strip of paper F, passing along under the glass panel in the direction of the arrow $a'$, said strip extending over a table G, supported on the sides of the compartment $A^6$. The paper F unwinds from a reel F', journaled in the upper portion of the compartment $A^6$, the paper after passing over the table G in an upward direction then extending downward from the upper end of said table to pass between two drawing-rollers H H', one of which is rotated for moving the paper intermittently forwardly, as hereinafter more fully described. After the paper leaves the bottom roller H it extends forward through the compartment $A^6$ and passes between two guide-rollers $F^2$ to wind on a reel $F^3$, journaled in the sides of the compartment $A^6$, directly below the reel F'. The reel $F^3$ carries on its shaft a wheel $F^4$, in frictional contact with a wheel $F^5$ on the shaft for the reel F', so that when the paper is moved forward by the drawing-rollers H H' and the reel F' is turned then a rotary motion is given by the wheels $F^4$ $F^5$ to the reel $F^3$ to rotate the latter and wind up the paper as it comes from the drawing-roller H and the guide-rollers $F^2$. The reel F' is preferably provided with a weight $F^6$ for increasing the frictional contact between the wheels $F^4$ $F^5$, it being understood that the shaft for said reel is loosely journaled in the sides of the compartment $A^6$ to permit the wheel $F^5$ to rest with its full weight and that of the reel and the paper-roll on the wheel $F^4$ to insure a proper rotation of the latter.

The uppermost drawing-roller $H'$ has its shaft $H^2$ extending through the partition $A^2$ into the compartment $A^7$ to carry at this end a star-wheel I, engaged by a pawl $I'$, pivoted on a lever J, fulcrumed at $J'$ on the partition $A^2$ and extending through a slot in the top of the desk $a$ to permit the operator to take hold of this lever and draw the same forward to swing the lever in the direction of the arrow $b'$ and cause the pawl $I'$ to turn the star-wheel I, the shaft $H^2$, and the drawing-roller $H'$, so as to move the paper in the direction of the arrow $a'$. The lowermost drawing-roller H is journaled in bearings $H^3$, (see Fig. 6,) pressed upwardly by springs $H^4$ to hold said drawing-roller H in firm contact with the paper F and press the latter firmly against the peripheral surface of the roller $H'$, so that when the latter is turned the paper is drawn forward in the direction of the arrow $a'$, as above described. The pawl $I'$ is drawn on by a spring $I^2$ to hold it in mesh with the star-wheel I, and said star-wheel is prevented from return movement by a dog $I^3$, pivoted to the partition $A^2$. (See Fig. 5.) The pawl $I'$ engages the star-wheel I, preferably at the top tooth, and a lowermost tooth is adapted to engage the free end of the pivoted latch D to impart a swinging motion thereto to disengage the catch and release the till at the time the lever J is swung forward, as above mentioned. The latch D is pivoted at $D^2$ to the rear face of the partition $A^3$, and the swinging motion of the latch is limited by a keeper $D^3$, as plainly indicated in Figs. 1, 2, 5, and 6. The catch $D'$ is secured to the rear end of the till and projects through an aperture $A^8$ in the partition $A^3$ to be engaged in the compartment $A^7$ by the latch D.

On the shaft $H^2$, carrying the drawing-roller $H'$, is secured a wheel K, over which passes the slip-paper L for making the sales-slips to be given to the customer, the slip-paper being pressed in firm frictional contact with the wheel K by a wheel $K'$, loosely journaled in bearings arranged in the compartment $A^6$ and pressed on by springs, preferably one of the springs $H^4$, to hold said wheel in firm contact with the paper, so that when the wheel K is rotated the slip-paper L is moved upward in the direction of the arrow $c'$, and the forward end of said paper is passed through a slot $B^4$ in the cover $B'$ alongside the glass panel $B^2$, as is plainly indicated in Fig. 1. The paper L unwinds from a roll held on a reel $L'$, removably carried in suitable bearings $L^2$, attached to the bottom of the compartment $A^6$. (See Fig. 6.) The end of the paper L extending through the slot $B^4$ upon the top of the cover $B'$ receives the legend of the sale made by a salesman, and this legend corresponds to the matter written on the paper F at the slot $B^3$. The spring $I^2$ for the pawl $I'$ is connected with the lower end of the operating-lever J, so that when the latter is swung forward in the direction of the arrow $b'$ and then released, then the said spring $I^2$ draws the lever back to its former normal position. (Shown in Fig. 5.) When the lever J is moved forward, the pawl $I'$ turns the star-wheel I, as previously mentioned, and both rolls of paper F and L are simultaneously moved, but in opposite directions, to bring a new writing-space in the slot $B^3$ and to project the paper L sufficiently beyond the slot $B^4$ to form a sales-slip of the projecting end, and at the same time the till or cash-drawer C is released and moved outward into an open position to permit the salesman to deposit the cash received in the till and write the legend of the sale on the paper F at the slot $B^3$ and also on the paper L at the slot $B^4$ to form the sales-slip to be given to the customer, it being understood that the two papers are separately written upon, after which the operator again closes the till and releases the lever J, so that the several parts are returned to their normal position. The successive sales are recorded in a like manner, and by having the glass panel $B^2$ in the cover $B'$ the number of recorded sales can be read through the glass panel previously to the paper F passing to the drawing-rollers H and $H'$.

It is evident that by the arrangement described a full record of the sales is made, so that the owner of the store has a full record of the day's sales, and the total amount stated on the paper F must correspond to the amount of cash in the drawer, so that a salesman cannot possibly cheat the owner.

In order to sound an alarm every time the lever J is pulled forward, we provide the following device: On the rear end of the pawl $I'$ is formed a projection $I^4$, adapted to engage the free end of a striker N for sounding an alarm-bell $N'$, supported in the compartment $A^7$, the striker N being pressed on by a spring $N^2$ to allow the lug $I^4$ to readily pass behind the free end of the striker at the time the lever J returns to its normal vertical position. (Shown in Fig. 5.)

In order to prevent unauthorized persons from opening the till by moving the lever J forward, the following device is provided: A transversely-extending lever O, fulcrumed at $O'$ in the compartment $A^6$, extends through a slot $A^9$ in the partition $A^2$ to reach over the rear end of the pawl $I'$, the lever O also extending through a slot $A^{10}$ in one side of the desk A to project a short distance beyond the side, so as not to be within sight of a strange person. On the outer end of the lever O is mounted to slide longitudinally a thin plate $O^2$, formed at its outer end with a projection $O^3$, sliding in a longitudinal recess in the outer end of the lever O, (see Fig. 6,) the projection extending slightly beyond one face of the lever, (see Fig. 1,) so as to be taken hold of by the salesman. The lever O extends through a plate P, attached to the outer face of the side of the desk A, in a bayonet-slot formed in the side plate, so as to hold the lever in an uppermost position, with the inner end of the plate $O^2$ engaged by a spring-pressed catch Q, fulcrumed on the inner face of the side of the desk, as is plainly shown in Figs. 1 and 4. When the several parts are in this position, the inner end of the lever O has imparted a swinging motion to the pawl I' to hold the star-wheel end thereof up against a bracket R, as indicated in dotted lines in Fig. 5, to lock the lever J against forward movement in the direction of the arrow $b'$.

In order to unlock the pawl I' and to permit it to swing downward in mesh with the star-wheel I by the action of its spring $I^2$, it is necessary that the inner end of the lever O be swung upward, and for this purpose the operator first pulls on the projection $O^3$ to slide the plate $O^2$ outward and move the inner rounded off end $O^5$ away from the opening in the catch Q, so that the free outer end of the lever O can be moved out of the horizontal portion of the bayonet-slot and then pressed downward into the vertical portion of said slot to swing the inner end upward for the release of the pawl I', as above mentioned. The lower edge of the plate $O^2$ is formed with a rounded-off shoulder $O^4$, so that when the outer end of the lever O is swung downward the said rounded-off shoulder moves in contact with the bottom of the vertical portion of the bayonet-slot in the plate P, so that the plate $O^2$ is caused to slide inward back to its former position.

After the salesman has placed the amount of a sale in the till, has written the legend of the sale on the paper F, made out a sales-slip and given it to the customer, and returned the till C to its former position, then the lever J is locked against movement by swinging the outer end of the lever O upward and engaging it with the horizontal member of the bayonet-slot to move the pawl I' out of engagement with the star-wheel I. When the outer end of the lever O is moved upward with the plate $O^2$ in an innermost position, then the spring-pressed catch Q again engages the top edge of the plate, and thus locks the lever in place until the plate $O^2$ is again shifted outward, as previously explained.

Having thus fully described our invention, we claim as new and desire to secure by Letters Patent—

1. In a machine of the class described, a casing provided with a table over which a sheet of paper is adapted to be passed and an opening through which a strip of paper is adapted to be projected, reels arranged in one end of the casing and upon and from which a sheet of paper is adapted to be wound and unwound, a reel at the opposite end of the casing and from which a strip is adapted to be unwound, feed-rollers for feeding the sheet of paper over the table, a second set of feed-rollers, one of which is carried by the shaft of one of the first-named feed-rollers, said feed-rollers serving to feed the strip of paper through the opening in the top of the casing and in a direction opposite to the line of travel of the sheet, and means for operating one of the first-named feed-rollers, substantially as described.

2. In a machine of the class described, a casing provided with a table over which a sheet of paper is adapted to be passed and with an opening through which one end of a strip is adapted to be passed, a feed device for feeding the sheet of paper, a feed device for feeding the slip of paper, said feed device being operated from the first feed device and feeding the slip in the opposite direction to that of the sheet, a till in the casing, a spring for opening the till, means for operating one of the feed devices, and a locking device for locking the till closed, and operated by the operating means of the first-named feed device, substantially as described.

3. In a machine of the class described, a casing provided with a table over which a sheet of paper is adapted to be passed and with an opening through which a strip is adapted to be passed, a feed device for feeding the sheet of paper, a feed device for feeding the slip of paper, said feed device being operated from the first feed device and feeding the slip in the opposite direction to that of the sheet, a till in the casing a spring for opening the till, means for operating the first-named feed device, a locking device for the till, operated from the said operating means, an alarm, and means for operating the alarm from the feed-operating means, substantially as described.

4. In a machine of the class described, the combination with a desk, feed-rollers mounted in the desk, and a star-wheel on the shaft of one of the feed-rollers, of a lever pivoted in the desk and having one end projecting out through the desk, a pivoted and spring-pressed pawl carried by the lever, and engaging the star-wheel, a pivoted locking-lever having one end projecting over the end of the pawl, and means for locking the locking-lever in position, substantially as described.

5. In a machine of the class described, the combination with a feed device, and a star-wheel for operating the feed device, of a pivoted operating-lever, a pawl pivoted to the operating-lever and a spring having one end secured to the pawl and its other end to the lever, whereby the spring serves to hold the pawl in engagement with the star-wheel and also to return the lever to its normal position, as set forth.

6. In a machine of the class described, the combination with a feed device, and a star-wheel for operating the feed device, of a pivoted operating-lever, a pivoted and spring-pressed pawl carried by the lever, means for locking the pawl out of engagement with the star-wheel, and means, whereby when the pawl is locked out of engagement with the star-wheel, the operating-lever will also be locked, substantially as described.

7. In a machine of the class described, the combination with feed-rollers, and a star-wheel on the shaft of one of the rollers, of a pivoted operating-lever, a pivoted and spring-pressed pawl carried by the lever, a pivoted lever for engaging the pawl to raise it out of engagement with the star-wheel, and a fixed stop against which the end of the pawl when out of engagement with the star-wheel, is held, substantially as described.

8. In a machine of the class described, the combination with feed-rollers, and a star-wheel on the shaft of one of the feed-rollers, of a pivoted lever, a pivoted and spring-pressed pawl carried by the lever and having one end engaging the star-wheel, a bell, and a pivoted and spring-pressed striker with which the other end of the said pawl engages, substantially as described.

9. In a machine of the class described, the combination with feed-rollers, and a star-wheel on the shaft of one of the feed-rollers, of a pivoted lever, a pivoted and spring-pressed pawl carried by the lever and having one end engaging the star-wheel, said pawl being provided with a lateral projection at its other end, a bell, and a pivoted and spring-pressed striker adapted to be engaged by the projection of the pawl, substantially as described.

10. In a machine of the class described, the combination with feed-rollers, and a star-wheel carried by one of said rollers, of a lever, a pivoted and spring-pressed pawl carried by the lever, and engaging the star-wheel, a pivoted locking-lever having one end projecting over one end of the pawl, a sliding plate on the end of the said lever, and a spring-catch for engaging said sliding plate, substantially as described.

11. In a machine of the class described, the combination with a desk, feed-rollers mounted therein, a star-wheel on the shaft of one roller, and means for operating the star-wheel to turn the feed-roller, of a till provided with a catch on its inner end, and a pivoted latch having one end engaging the said catch and its other end projecting into the path of the star-wheel, substantially as described.

12. A machine of the class described, provided with a manually-operated lever, a pawl carried by the lever, a star-wheel adapted to be turned by said pawl, a pair of drawing-rollers between which the paper passes, one of said rollers turning with said star-wheel, a table over which the paper passes before passing between the drawing-rollers, the table permitting of conveniently writing on the paper through a slot in the frame of the machine, an unwinding-reel for carrying the roll of paper to be drawn over the said table by the said drawing-rollers, a winding-up reel for winding up the paper after it leaves the drawing-rollers, friction-wheels on the shafts of the said reels, for driving the winding-up reel from the unwinding-reel, the latter being located above the winding-up reel, and a weight carried by the said unwinding-reel shaft, for holding the wheel of the latter in frictional contact with the wheel of the winding-up reel, substantially as shown and described.

13. A machine of the class described, provided with a manually-operated lever, a pawl carried by the said lever, a star-wheel adapted to be turned by said pawl, a till-locking device controlled by said star-wheel, and a locking device for the said lever, to hold the latter against movement and prevent opening of the till by unauthorized persons, substantially as shown and described.

14. A machine of the class described, provided with a manually-operated lever, a pawl carried by the said lever, a star-wheel adapted to be turned by said pawl, a till-locking device controlled by said star-wheel, a locking device for the said lever, to hold the latter against movement and prevent opening of the till by unauthorized persons, the said locking device comprising a locking-lever engaging the said pawl, a slide on said locking-lever, and a latch for engaging the said slide, to lock the locking-lever in place, substantially as shown and described.

15. In a machine of the class described, the combination with a star-wheel, a till-locking device controlled by the star-wheel, an operating-lever, and a pawl carried by the lever and engaging the star-wheel, of a pivoted locking-lever having its inner end projecting over one end of the said pawl, a slide on the outer end of the said lever and having a round inner end, and a spring-pressed catch notched to engage the said slide, substantially as described.

16. In a machine of the class described, the combination with a desk or the like provided with an opening in one side over which is secured a plate having a bayonet-slot, a star-wheel, a till-locking device controlled by the star-wheel, an operating-lever, and a pawl carried by the lever and engaging the star-wheel, of a pivoted locking-lever having its inner end projecting over one end of the pawl, a slide mounted on the outer end of the said lever, and having a shoulder on its under side, and a pivoted latch provided with a notch for engaging the said slide, substantially as described.

CARL J. D. WALTER.
JOHN RODGERS.

Witnesses:
THEO. G. HOSTER,
JNO. M. RITTER.